US012404817B2

(12) United States Patent
Srinivas et al.

(10) Patent No.: US 12,404,817 B2
(45) Date of Patent: Sep. 2, 2025

(54) ELECTRONIC TURBINE AND ENGINE EXHAUST GAS RECIRCULATION FOR REDUCTION OF COLD START EMISSIONS AND NOISE VIBRATION AND HARSHNESS

(71) Applicant: FCA US LLC, Auburn Hills, MI (US)

(72) Inventors: Pavan Kumar Mukkara Srinivas, Troy, MI (US); Ronald A Reese, II, Goodrich, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/476,519

(22) Filed: Sep. 28, 2023

(65) Prior Publication Data

US 2025/0109715 A1 Apr. 3, 2025

(51) Int. Cl.
*F02D 41/00* (2006.01)
*F02D 41/06* (2006.01)

(52) U.S. Cl.
CPC ..... *F02D 41/0052* (2013.01); *F02D 41/0007* (2013.01); *F02D 41/0077* (2013.01); *F02D 41/064* (2013.01); *F02D 2200/0406* (2013.01)

(58) Field of Classification Search
CPC ............. F02D 41/0052; F02D 41/0007; F02D 41/0077; F02D 41/064; F02D 2200/0406; F02D 41/0255; F02D 41/068
See application file for complete search history.

(56) References Cited

U.S. PATENT DOCUMENTS 11,519,313 B1 * 12/2022 Martz ........................ F01N 9/00
2017/0022954 A1 * 1/2017 Xiao ........................ F02B 33/40
2019/0376461 A1 * 12/2019 Martz .................... F02D 41/029
2020/0271046 A1 * 8/2020 Kelly ....................... F02B 37/10
2022/0010742 A1 * 1/2022 Cox .................... F02N 11/0829

* cited by examiner

*Primary Examiner* — Syed O Hasan

(74) *Attorney, Agent, or Firm* — Jeremy J. Klobucar

(57) ABSTRACT

An engine system that delivers torque to a driveline of a vehicle includes an internal combustion engine (ICE), a manifold, an exhaust gas recirculation (EGR) circuit, an electric turbine (eTurbine) and a controller. The EGR circuit has an EGR valve that selectively moves between open and closed positions. The eTurbine is driven by an electric motor and is configured to deliver air away from the manifold. The controller determines an ICE start request and, based on the ICE start request, sends a signal to the EGR valve to open thereby fluidly connecting the manifold and the eTurbine. The controller sends a signal to the eTurbine to rotate and move air out of the manifold through the EGR circuit. The eTurbine is used to deplete air in the manifold before starting the ICE. As a result, a reduction in fuel used and therefore a reduction in emissions at startup is achieved.

7 Claims, 3 Drawing Sheets

ELECTRONIC TURBINE AND ENGINE EXHAUST GAS RECIRCULATION FOR REDUCTION OF COLD START EMISSIONS AND NOISE VIBRATION AND HARSHNESS

FIELD

The present application generally relates to cold start emissions of internal combustion engines and, more particularly, to a system and method to reduce cold start emissions as well as noise, vibration and harshness.

BACKGROUND

The majority of emissions are produced during cold start of an internal combustion engine (ICE) where the catalyst has yet to reach preferred operating temperature. Airflow rate of the ICE during a cold start in both conventional and hybrid start is more than what is needed because the manifold pressure is at ambient pressure at the initial start. More airflow corresponds to more fuel being burned and hence more emissions being created. Further, excess airflow also causes higher noise vibration and harshness (NVH) to be created in the powertrain and experienced by the driver.

Existing solutions to reduce emissions at during a cold start-up of and ICE can incorporate variable lift camshafts with small lift to reduce the amount of airflow going into the cylinder. In general, such technology and implementation is expensive. Accordingly, while some cold start emissions systems do work well for their intended purpose, there exists an opportunity for improvement in the relevant art.

SUMMARY

According to one example aspect of the invention, an engine system that delivers torque to a driveline of a vehicle includes an internal combustion engine (ICE), a manifold, a high pressure exhaust gas recirculation (EGR) circuit, an electric turbine (eTurbine) and a controller. The manifold selectively communicates air into the ICE. The EGR circuit has an EGR valve that selectively moves between an open position and a closed position. The eTurbine is driven by an electric motor and is configured to deliver air toward and away from the manifold. The controller determines an ICE start request and, based on the ICE start request, sends a signal to the EGR valve to open thereby fluidly connecting the manifold and the eTurbine. The controller sends a signal to the eTurbine to rotate and move air out of the manifold through the EGR circuit.

In some implementations, the controller is further configured to receive a signal from a manifold pressure sensor indicative of a measured pressure in the manifold. The controller is further configured to determine whether the manifold pressure has reached a threshold pressure and stop rotation of the eTurbine based on reaching the threshold pressure.

According to another example aspect of the invention, the engine system further comprises a throttle that moves between an open position that allows air to be directed into and out of the manifold, and a closed position that inhibits air from being directed into and out of the manifold.

In some implementations, the controller is further configured to send a signal to the throttle, based on the ICE start request, to move the throttle to the closed position.

In other implementations, the controller is further configured to send a signal to the eTurbine, based on reaching the threshold pressure, to turn off the eTurbine.

In additional implementations, the controller is further configured to send a signal to the EGR valve, based on reaching the threshold pressure, to close the EGR valve.

In additional implementations, the controller is further configured to send a signal to the ICE to crank the ICE, subsequent to turning off the e Turbine.

In other implementations, the engine system further comprises a compressor, wherein the electric motor rotates a shaft associated with the compressor and the turbine.

A method of operating an engine system that delivers torque to a driveline of a vehicle is provided. A start request in an engine system having an internal combustion engine (ICE) is received. A signal is sent, based on receiving the start request, to an EGR valve, disposed in an EGR circuit, to open the EGR valve. A signal is sent, based on receiving the start request, to an electric motor to rotate a turbine to move air in a direction out of the manifold thereby creating a vacuum through the EGR circuit and moving air out of the manifold. A signal is received from a manifold air pressure (MAP) sensor indicative of a measured pressure in the manifold. A determination is made whether the measured pressure in the manifold satisfies a threshold, the threshold corresponding to a reduced pressure in the manifold suitable to reduce emissions at startup of the ICE. A signal is sent to the electric motor to stop rotating the eTurbine based on the measured pressure satisfying the threshold. A signal is sent to the EGR valve to close the EGR valve. A signal is sent, based on the measured pressure satisfying the threshold, to the engine system to crank the ICE.

In additional arrangements, a signal is sent to a throttle, based on receiving the start request, causing the throttle to move to a closed position.

According to another example aspect of the invention, sending a signal to an electric motor to rotate the eTurbine comprises rotating a shaft with the electric motor causing the eTurbine to rotate.

In some implementations, sending a signal to an electric motor to rotate an eTurbine to move air in a direction out of the manifold comprises moving air from the manifold, through the EGR circuit and out of an exhaust.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, there exists an opportunity for improvement in the art of cold start emissions of internal combustion engines. As is known, the majority of emissions are produced during cold start of an ICE where the catalyst has yet to reach preferred operating temperatures. The airflow rate of the ICE during a start in both conventional and hybrid start is more than what is needed because the manifold pressure is at ambient pressure at the initial start. More airflow corresponds to more fuel being burned and therefore more unwanted emissions. Further, excess airflow also causes higher noise vibration and harshness.

The present disclosure provides an engine system that incorporates an eTurbine and high pressure EGR circuit that are used to deplete the manifold before starting the ICE. When an engine start is requested, and before cranking, an EGR valve of the EGR circuit is opened while the eTurbine is rotated using an electric motor of the eTurbine. The opening of the EGR valve and operation of the eTurbine allows air to be drawn out of the manifold, through the EGR circuit by the eTurbine. In other words, rotating the eTurbine results in a vacuum pump drawing the air out of the manifold through the EGR circuit and out the exhaust system. The throttle is kept fully closed during the flushing operation. The amount of air drawn out is monitored using a manifold pressure sensor. Once the manifold pressure reaches a desired threshold, the EGR valve is closed and the eTurbine is turned off or brought back to zero revolutions. Thereafter, normal cranking sequence of the ICE starts. Because of the reduction of air in the manifold, less fuel is used and therefore less emissions are created.

Figure 1:
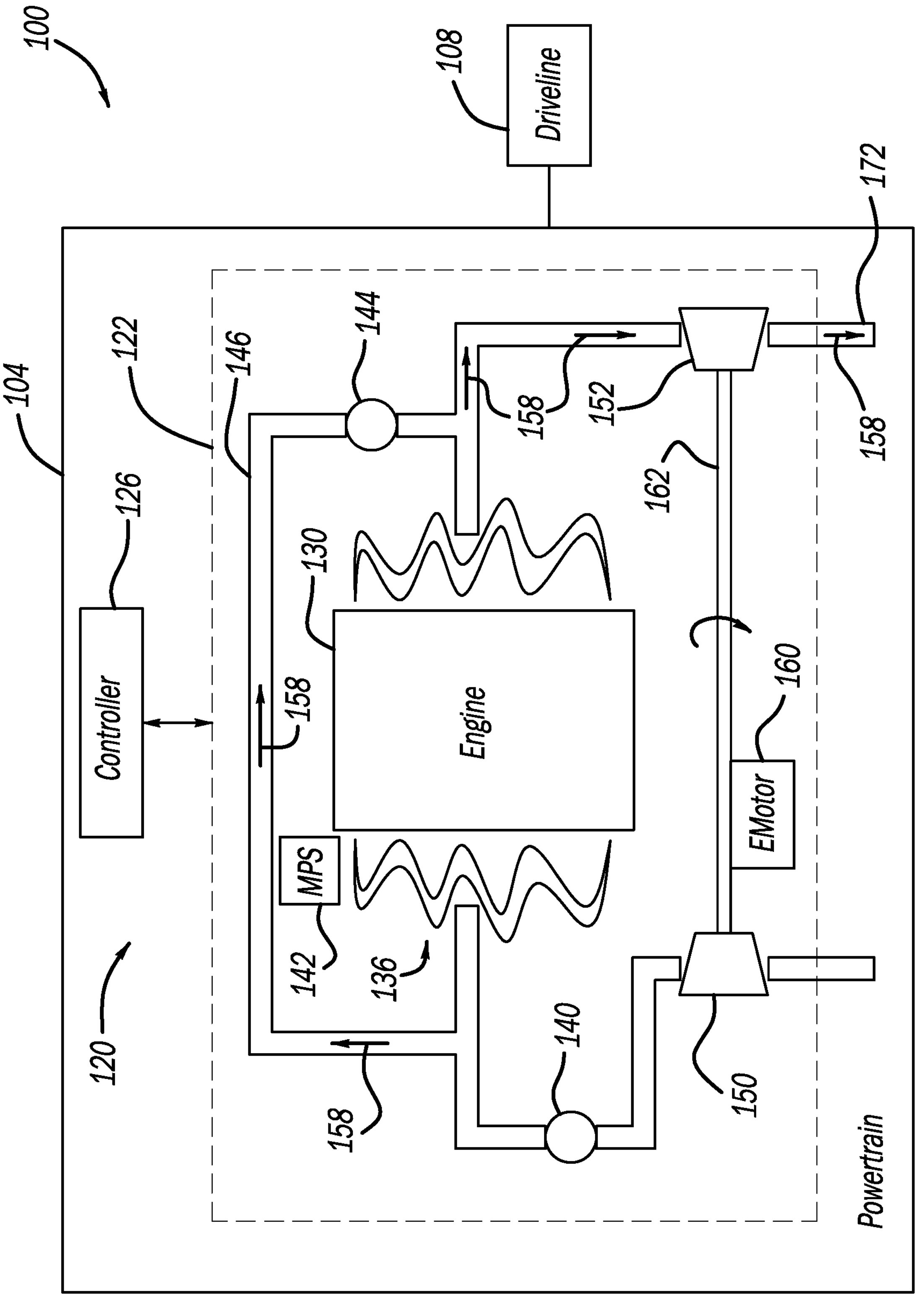
FIG. 1 is a functional block diagram of an engine system including an electronic turbine (hereinafter "eTurbine") and exhaust gas recirculation circuit (hereinafter "EGR circuit") that depletes the manifold before starting the ICE according to the principles of the present application.

Referring now to FIG. 1, a functional block diagram of an example vehicle 100 according to the principles of the present application is illustrated. The vehicle 100 includes powertrain 104 configured to generate and transfer drive torque to a driveline 108 of the vehicle 100 for propulsion. The powertrain 104 generally comprises an engine system 120 including an engine assembly 122 and a controller 126. The engine assembly 122 includes an ICE 130 having a manifold 136 that selectively communicates air to the ICE 130. A throttle 140 actuates between open, closed and intermediate positions to alter an air amount into the manifold 136. A manifold pressure sensor 142 can measure a pressure of the manifold 136 and communicate a signal to the controller 126 indicative of the measured pressure.

The ICE 130 includes an exhaust gas recirculation (EGR) valve 144 that moves between open and closed positions. As will be described herein, when the EGR valve moves to the open position, air is free to move from the manifold 136 through an EGR circuit 146 in the direction of arrow 158. The engine assembly 122 further includes a compressor 150, a turbine 152 and an electric motor 160. The electric motor 160 rotates a shaft 162 that in turn rotates the turbine 152 and/or the compressor 150.

It will be appreciated that while the engine system 120 is shown having only the ICE, the engine system 120 can also be configured as a hybrid powertrain having one or more electric propulsion motors.

During operation of the engine system 122, the controller 126 sends a signal to the EGR valve 144 to move to the open position based on a start request of the ICE. Furthermore, the controller 126 sends a signal to the throttle 140 to close the throttle 140. In addition, the turbine 152 is operated causing a vacuum pump that draws air out of the manifold 136, through the EGR circuit 146 and out an exhaust 172. During normal engine use, the compressor 150 and turbine 152 typically operates in a direction to direct air into the manifold 136 by rotating the shaft 162. In the method of the instant disclosure, the controller 126 sends a signal to the turbine 152 to remove air from the manifold 136 by drawing air from the manifold 136 around the EGR circuit 146. Once the pressure in the manifold 142 reaches a desired threshold, a signal is sent from the controller 126 to the EGR valve 144 to close the EGR valve 144. In addition, a signal is sent from the controller 126 to the eTurbine 152 to turn off the eTurbine 152 to bring it back to zero revolutions. Thereafter, normal cranking sequence of the ICE 130 starts.

Figure 2:
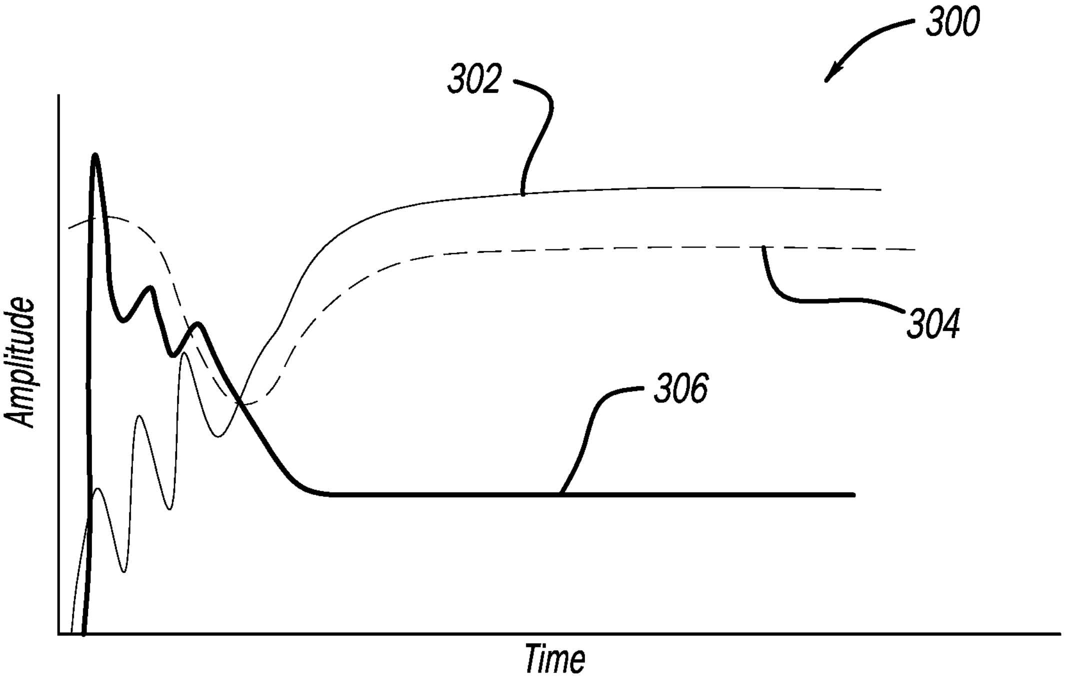
FIG. 2 Prior Art
FIG. 2 is a plot illustrating engine speed, manifold air pressure (MAP) and airflow rate for a conventional ICE at startup according to Prior Art.

Turning now to FIG. 2, a plot 300 illustrating engine speed 302, manifold air pressure (MAP) 304 and airflow rate 306 for a conventional ICE at startup according to Prior Art is shown. As shown, with MAP 304 elevated at startup, airflow rate 306 too is elevated resulting in additional fuel requested at the ICE and excess emissions being created (due to the catalyst not adequately heated up yet). Additionally, engine start experienced at the ICE can be rough adding to unwanted NVH.

Figure 3:
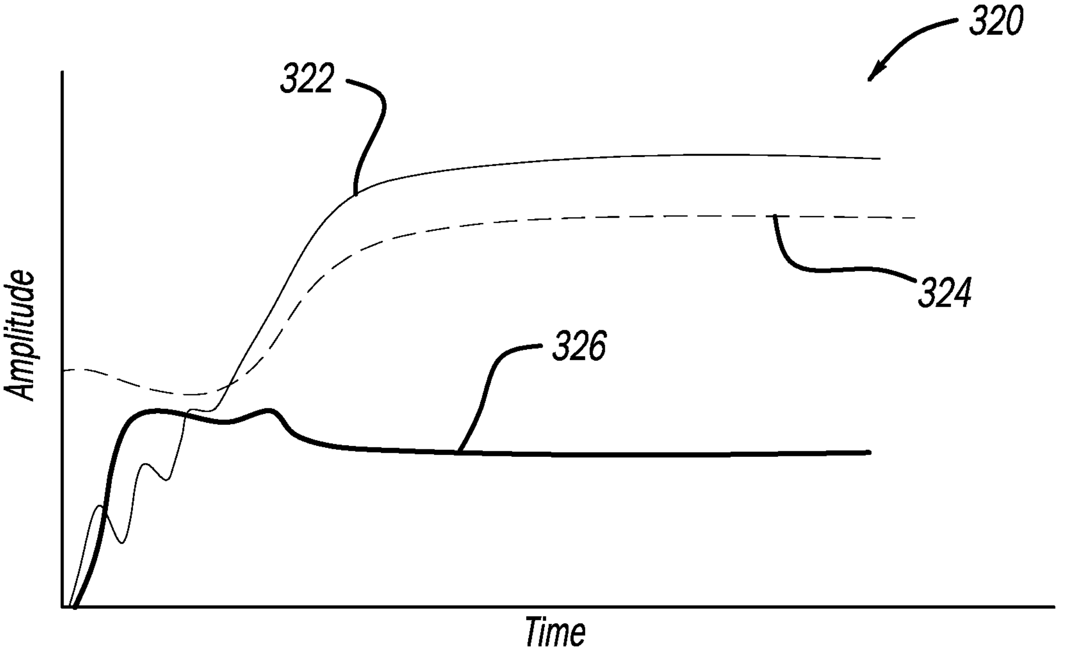
FIG. 3 is a plot illustrating engine speed, manifold air pressure (MAP) and airflow rate for the engine system of FIG. 1 according to the principles of the present application.

With reference to FIG. 3, a plot 320 illustrating engine speed 322, manifold air pressure (MAP) 324 and airflow rate 326 for the engine system 120 according to the principles of the present application is shown. As illustrated, with decreased MAP 324 at startup, a decrease in airflow rate 326 exists. With decreased airflow, decreased fuel is needed and therefore decreased emissions is achieved. Moreover, a smoother start is experienced at the ICE 130 due to a reduced and consistent engine speed 322.

Figure 4:
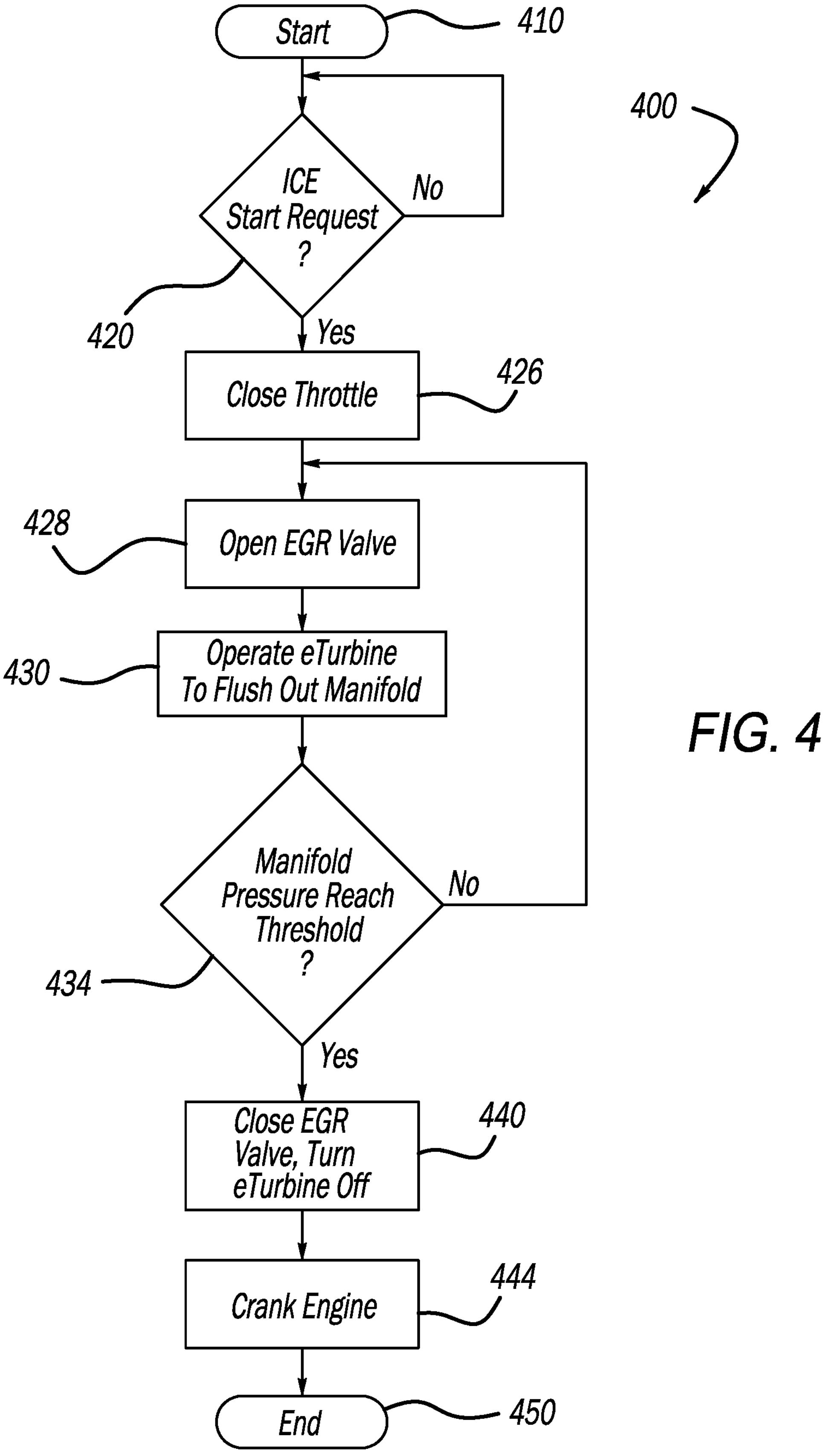
FIG. 4 is a flow chart illustrating a method of operating the engine system of FIG. 1 according to principles of the present application.

With additional reference now to FIG. 4, a method 400 of controlling the engine system 120 according to examples of the present disclosure will be described. The method starts at 410. At 420 control determines whether there has been an ICE start request. If no key on event has been detected, control loops to 420. If control determines that a key on (or ICE start request) event has been detected, control sends a signal to the throttle 140 to close at 426. At 428, control sends a signal to the EGR valve 144 to open the EGR valve 144 thereby fluidly connecting the EGR circuit 146 with the manifold 136. At 430, control operates the eTurbine 152 (causing air to flow in the direction 158) to flush out the air in the manifold 136.

At 434, control determines whether the pressure in the manifold 136 has reached a threshold. In examples, the controller 126 can receive a pressure signal from the MPS 142. The threshold can be set to any pressure indicative of a sufficient minimum pressure to satisfy a reduction in emissions. If control determines that the pressure in the manifold 136 has not reached a threshold at 434, control loops to 430. If control determines that the pressure in the manifold 136 has reached the threshold at 434, control turns the eTurbine 152 off and the EGR valve 144 is closed at 440. At 444 control cranks the ICE 130. Control ends at 450.

In advantages, the vehicle 100 that incorporates the present engine system 120, achieves a decrease in emissions and NVH by depleting the manifold 136 whereas strategies that require variable cams create a restriction to allow less air into the cylinders of the ICE. A significant advantage in the present disclosure is that a vehicle that already uses an e Turbine and EGR valve, there is no extra hardware needed. Instead, the controller 126 is used to operate the e Turbine and EGR valve as needed gaining a significant cost benefit as compared to current solutions.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above.

It will also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A method of operating an engine system that delivers torque to a driveline of a vehicle, the method comprising: receiving a start request in an engine system having an internal combustion engine (ICE), a manifold that selectively communicates air into the ICE, a compressor, a turbine and an electric motor, the electric motor configured to rotate a shaft that in turn rotates the turbine and the compressor; sending a signal, based on receiving the start request, to an EGR valve to open the EGR valve, the EGR valve disposed in an EGR circuit; sending a signal, based on receiving the start request, to the electric motor to rotate the turbine arranged downstream of the EGR valve to move air in a direction out of the manifold thereby creating a vacuum through the EGR circuit and moving air out of the manifold;

receiving a signal from a manifold air pressure (MAP) sensor indicative of a measured pressure in the manifold; determining whether the measured pressure in the manifold satisfies a threshold, the threshold corresponding to a reduced pressure in the manifold suitable to reduce emissions at startup of the ICE; sending a signal to the electric motor to stop rotating the turbine based on the measured pressure satisfying the threshold; sending a signal to the EGR valve to close the EGR valve; and sending a signal, based on the measured pressure satisfying the threshold, to the engine system to crank the ICE; wherein the compressor, the turbine and the electric motor collectively comprise a main and only turbocharger system of the engine system.

2. The method of claim 1, further comprising:

sending a signal to a throttle, based on receiving the start request, causing the throttle to move to a closed position.

3. The method of claim 1, wherein sending a signal to an electric motor to rotate the turbine comprises rotating a shaft with the electric motor causing the turbine to rotate.

4. The method of claim 1, wherein sending a signal to an electric motor to rotate a turbine to move air in a direction out of the manifold comprises moving air from the manifold, through the EGR circuit and out of an exhaust.

5. The method of claim 1, wherein sending a signal to the electric motor to stop rotating the turbine based on the measured pressure satisfying the threshold further comprises:

sending a signal to the electric motor to bring the turbine back to zero revolutions.

6. The method of claim 5 wherein sending a signal, based on the measured pressure satisfying the threshold, to the engine system to crank the ICE further comprises:

initiating, based on zero revolutions of the turbine, normal cranking sequence of the ICE.

7. The method of claim 1, further comprising: subsequent to cranking the ICE, operating the turbine in a normal engine use wherein the compressor and the turbine direct air into the manifold by rotating the shaft.

* * * * *